April 22, 1941.  I. M. SCHWAB  2,239,575
OPHTHALMIC MOUNTING
Filed Jan. 22, 1940
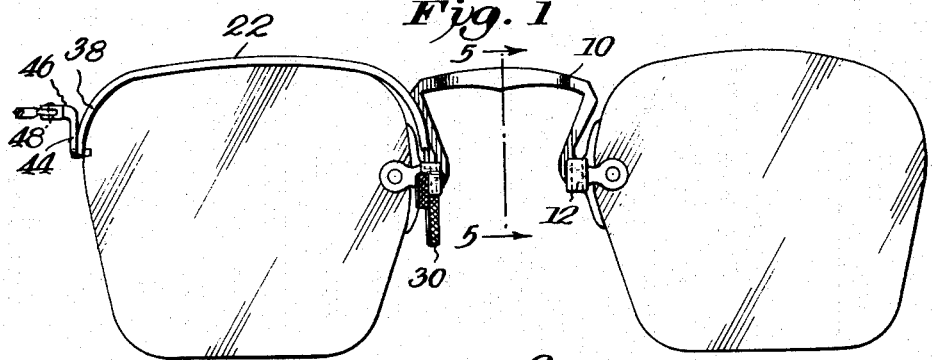
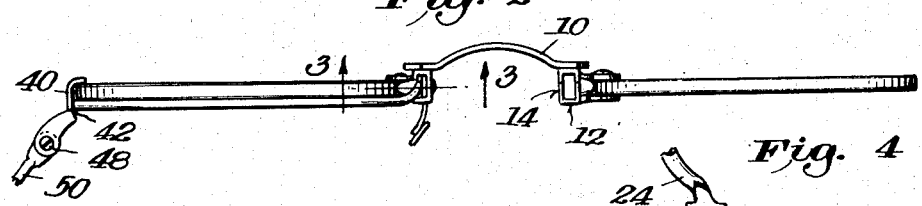
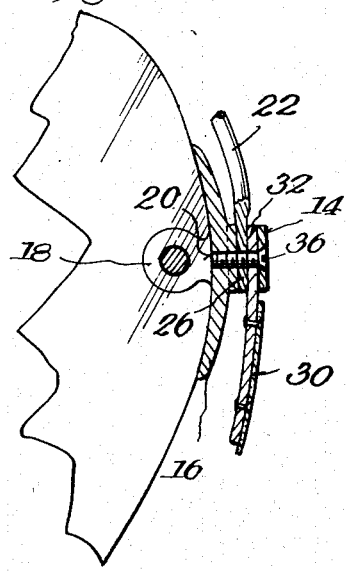
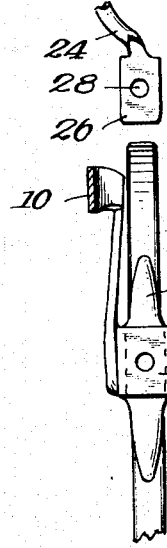
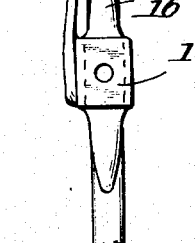
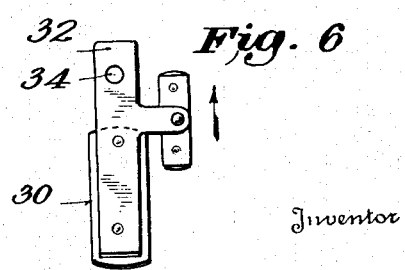
Inventor
Isaac M. Schwab,
By Richard L. Underwood
Attorney Patented Apr. 22, 1941

2,239,575

UNITED STATES PATENT OFFICE 2,239,575

OPHTHALMIC MOUNTING

Isaac M. Schwab, Savannah, Ga.

Application January 22, 1940, Serial No. 315,113

7 Claims. (Cl. 88—41)

This invention relates to ophthalmic mountings of what may be termed in general the substantially rimless type, which type is well illustrated in Uhlemann Patent No. 2,108,875, February 22, 1938.

The facial characteristics of individuals vary considerably and in fitting spectacles or eyeglasses it is always necessary to determine first the particular width of lens best suited to the patient and the width of bridge required to properly position the lenses before the patient's eyes and retain them so positioned.

Hitherto the rimless type spectacle mountings to which this invention relates have been formed in a single integral unit except for the temples which are usually hingedly connected to said unit. Each integral unit mounting is formed from several pieces, the lens strap, side arms, nose piece, etc., all being soldered or brazed together to obtain the unit. For this reason it has been essential for the optician who wishes to provide the utmost service to his patients to carry in stock an inordinately large number of mountings.

To illustrate the above more specifically, there are four standard widths for bridge members and there are likewise four standard lengths of side arms for positioning the lenses. Thus when integral mountings comprising bridge member and side arms for positioning the lenses are stocked it is necessary to have available sixteen individual units and mountings to accommodate the maximum range of variations.

An object of this invention is to eliminate the necessity for stocking so many different sizes of individual mountings and eliminate many of the difficulties encountered by the ordinary optician in fitting his patients.

A further object of the invention is to substantially strengthen the mounting and to so assemble the various component units comprising the same as to eliminate much of the strain ordinarily exerted on the lenses themselves when the wearer puts them on and takes them off. Bridge members should be flexible in a forward and rearward direction since the wearer customarily forces the temple pieces, side arms or lenses forwardly to widen the space between the nose guards when putting on or taking off the spectacles, thus springing the bridge member outwardly. Substantial breakage of integrally soldered units has resulted from this manipulation, the breakage usually occurring at the end of the bridge member where it is soldered onto the arm of the nose guard or lens strap. This difficulty is eliminated by my improved arrangement and association of parts.

Various other objects and meritorious features of the invention will be apparent from the following description taken in conjunction with the drawing, wherein like numerals refer to like parts throughout the several figures, and wherein:

Figure 1 is a rear elevation, illustrating by the left and right assemblies, respectively, different aspects of the invention;

Fig. 2 is a plan view of Fig. 1;

Fig. 3 is an enlarged elevation, partially in section, of a detail, and

Figs. 4, 5, and 6 represent together an exploded view looking in the direction of 5—5 in Fig. 1 of certain elements prior to positioning and assembly.

As illustrated in the drawing the bridge member 10 is flexed outwardly somewhat at its center and is substantially flat to faciliate its flexing in a forward and rear direction as distinguished from up and down. This is the customary procedure when putting on or taking off spectacles. The bridge member terminates in substantially flat ends, or ends which are at least flat on the rear surface thereof, and which are substantially coextensive in area with the forward walls of box studs 12. These box studs are open at their ends and provided with front, rear, and side walls. The side walls 14 are provided with registering apertures, one of which is threaded.

The flat end portions of bridge member 10 are soldered or brazed to the forward walls of box studs 12 and the flat bearing surface thus provided between the ends of the bridge member and the studs is substantially coextensive in area with that of the front walls of the studs.

To the outer faces of the side walls of box studs 12 are soldered lens straps 16 provided with the usual apertured ears 18 through which a screw extends to position the lens. The lens strap 16 is apertured as indicated at 20, which aperture is in alinement with the alined apertures in the side walls of box stud 12.

A pair of side arms 22, shaped to conform to the peripheral contour of a lens, complete the basic assembly of the mount. These arms are preferably flexible but somewhat pliable to render them readily conformable to a lens contour. Each arm is offset as indicated at 24 adjacent its inner end and terminates in a flattened portion 26 substantially coextensive in area with the side walls of a box stud 12. This flattened portion is apertured as indicated at 28 and the aperture is adapted to register with the apertures in the side walls of a box stud when the said flattened portion 26 is positioned inside the same in overlapping relation with the side walls thereof.

In the arrangement illustrated in the drawing, box studs 12 have been made sufficiently large to position a nose guard 30 as well as the side arm 22. The nose guard is provided with a flat supporting arm 32, apertured as indicated at 34, adapted to seat in a box stud in overlapping relation to the side walls thereof and the flattened end portion 26 of arm 22. When so positioned the aperture 34 is in register with apertures 20 and 28 and the apertures in the side walls of the stud. It will be apparent that any type of nose guard may be used although but one form has been illustrated in the drawing. The important feature is that it be provided with a flat apertured supporting arm adapted for positioning in a box stud.

A screw 36 extends through the alined apertures as indicated clearly in Fig. 3 to firmly retain the composite assembly in place. It will be noted that the end of the screw is adapted to abut against the peripheral edge of the lens whereby additional tightening means is provided for the latter. Not only may the screws extending through the apertures in lens strap ears 18, and transversely through the lens itself, be tightened for this purpose, but by tightening screw 36 abutting against the peripheral edge of the lens the wall of the transverse lens aperture is forced tightly against the screw extending through the lens.

In the form illustrated the outer portion of each side arm 22 terminates in a downwardly extending portion 38 to which is secured at a point substantially above the middle of the lens, as by soldering or brazing, a lens clamp 40 which assists in retaining the lens in the mount. The lens clamp is preferably of pliable material and extends rearwardly as indicated at 42, then upwardly as indicated at 44, and outwardly as at 46, terminating in a hinge connection 48 adapted to receive temple 50. The pliability of the material constituting the combined temple connection and lens clamp facilitates adjustment of the lens in the mount and adjustment of the temples to the particular facial contours of an individual.

It will be apparent that the wide flat bearing forming the connection between the bridge member and the box studs substantially strengthens this portion of the assembly. The four standard widths of bridge member may be kept in stock, each having associated therewith box studs as hitherto described. Having selected the width of bridge it then is only necessary to select the length arm 22 which conforms to the predetermined lens size adapted for an individual. In this way the number of elements necessary to cover the full range of variation in bridge width and lens size is reduced to eight. At the same time the rigidity of the assembly formed by positioning the flat inner ends of the side arms and the flat supporting arms of the nose guards in overlapping relation between the side walls of the box studs and firmly uniting these with the lens straps substantially increases the strength of the entire mounting and to a large extent reduces the stresses set up in the lenses themselves when the spectacles are put on and removed.

The lens clamp 40 at the outer end of each side arm 22 likewise assists in positioning the lens rigidly with reference to the arm and eliminates in this way much of the strain put on the lens when the mounting is flexed.

Having described a preferred embodiment of the invention, various modifications will be apparent to those skilled in the art and for that reason I wish to limit myself only within the scope of the appended claims.

What I claim is:

1. In a rimless type spectacle mounting, the combination of a substantially flat bridge member flexible in the direction of a lens axis and having substantially flat extremities, box studs each having a forward wall secured in substantially coextensive overlapping relation to the rear face of said bridge member at the respective ends thereof, lens straps secured to the outer side walls of said studs, side arms shaped to the upper peripheral contour of a lens each extending at one end into a box stud, respectively, means releasably positioning said ends of the arms within the respective studs, and a temple connection adjacent the other end of each arm.

2. In a rimless type spectacle mounting, the combination of a substantially flat bridge member flexible in the direction of a lens axis and having substantially flat extremities, box studs each having open ends and forward, rear, and side walls, means securing the flat extremities of said bridge member to the outer faces of the forward walls of said box studs, respectively, in substantially coextensive overlapping relation thereto, lens straps secured to the outer faces of the outer side walls of the respective studs, side arms shaped to the upper peripheral contour of a lens, the inner ends of each terminating in a flat forwardly offset portion extending into a box stud, respectively, means releasably positioning the ends of the arms within the respective studs, and a temple connection adjacent the outer end of each arm.

3. In a rimless type spectacle mounting, the combination of a pair of box studs open at each end and having forward, rear, and side walls, a substantially flat bridge member flexible in the direction of a lens axis and having substantially flat extremities each secured in substantially coextensive overlapping relation to the front face of the forward wall of a stud, lens straps secured to the outer faces of the outer side walls of said studs, a pair of side arms shaped to the upper peripheral contour of a lens each terminating at its inner end in a flat, forwardly offset portion substantially coextensive in area with a side wall of a box stud and extending thereinto, means releasably positioning said inner ends of the arms within the respective studs, and a temple connection adjacent the outer end of each arm.

4. In a rimless type spectacle mounting, the combination of a pair of box studs open at each end and having forward, rear, and side walls, a substantially flat bridge member flexible in the direction of a lens axis and having substantially flat extremities each secured in substantially coextensive overlapping relation to the front face of the forward wall of a stud, lens straps secured to the outer faces of the outer side walls of said studs, a pair of side arms shaped to the upper peripheral contour of a lens each terminating at its inner end in a flat, forwardly offset portion substantially coextensive in area with a side wall of a box stud and extending thereinto, a pair of nose guards each having an arm terminating in a portion substantially coextensive in area with a side wall of said box stud and extending thereinto into overlapping relation with the end of a side arm, means releasably positioning the ends of said side arms and said nose guard arms within the respective studs, and a temple connection adjacent the outer end of each arm.

5. In a rimless type spectacle mounting, the combination of a pair of box studs open at each end and having forward, rear, and side walls, a bridge member terminating in substantially flat extremities each secured in substantially coextensive overlapping relation to the front face of the forward wall of a stud, lens straps secured to the outer faces of the outer side walls of said studs, a pair of side arms shaped to the upper peripheral contour of a lens each terminating at its inner end in a flat, forwardly offset portion substantially coextensive in area with a side wall of a box stud and extending thereinto, a pair of nose guards each having an arm terminating in a portion substantially coextensive in area with a side wall of said box stud and extending thereinto into overlapping relation with the end of a side arm, means releasably positioning the ends of said side arms and said nose guard arms within the respective studs, and a lens clamping member adjacent the outer end of each side arm offset forwardly therefrom, said clamping member including a pliable portion extending rearwardly, upwardly, and outwardly and terminating in a temple connection.

6. In a rimless type spectacle mounting, the combination of a pair of hollow box studs open at each end and including forward, rear, and side walls, a substantially flat bridge member flexible primarily in a forward and rear direction, said bridge member terminating in substantially flat faces each secured in overlapping substantially coextensive relation to a forward wall of a box stud, a lens strap secured to the outer side wall of each box stud, a pair of side arms shaped to the upper peripheral contour of a lens terminating in forwardly offset flattened portions substantially coextensive in area with a side wall of a box stud, means for releasably positioning said flattened ends of the arms within said box studs, and temple connections adjacent the other ends of said side walls.

7. In a rimless type spectacle mounting, the combination of a pair of box studs open at each end and having forward, rear, and side walls, the side walls being provided with registered apertures one of which is threaded, a substantially flat bridge member flexible in the direction of a lens axis and secured at each end to the front wall of a stud, lens straps secured to the outer side walls of the respective studs, each strap including an aperture in register with the apertures in said stud, a pair of side arms shaped to the upper peripheral contour of a lens and including apertured inner end portions extending into the respective box studs, the apertures being in register with the apertures in said studs, and a screw extending outwardly through the registered apertures associated with each stud releasably positioning the side arms and adapted to extend through the lens strap into contact with the peripheral edge of a lens positioned thereby.

ISAAC M. SCHWAB.